US009685043B2

(12) United States Patent
Naicker et al.

(10) Patent No.: US 9,685,043 B2
(45) Date of Patent: Jun. 20, 2017

(54) ELECTRONIC GAMING MACHINE WITH DIE-BASED RANDOM RESULT GENERATOR

(71) Applicant: Pridefield Limited, Douglas (IM)

(72) Inventors: Theo Naicker, Durban (ZA); Rory Angus Harpur, Durban (ZA)

(73) Assignee: Pridefield Limited (GB)

( * ) Notice: Subject to any disclaimer, the term of this patent is extended or adjusted under 35 U.S.C. 154(b) by 272 days.

(21) Appl. No.: 14/566,268

(22) Filed: Dec. 10, 2014

(65) Prior Publication Data

US 2015/0161851 A1 Jun. 11, 2015

(30) Foreign Application Priority Data

Dec. 11, 2013 (GB) .................................. 1321903.5

(51) Int. Cl.
*G06F 19/00* (2011.01)
*G07F 17/32* (2006.01)

(52) U.S. Cl.
CPC ........ *G07F 17/3286* (2013.01); *G07F 17/326* (2013.01); *G07F 17/3213* (2013.01)

(58) Field of Classification Search
None
See application file for complete search history.

(56) References Cited

U.S. PATENT DOCUMENTS 2,693,962 A 11/1954 Stevens
5,885,157 A 3/1999 Harada et al.
6,173,955 B1 * 1/2001 Perrie ..................... G07F 17/34 273/138.2
6,394,901 B1 * 5/2002 Marta ................ G07F 17/3202 273/142 R
6,776,413 B2 * 8/2004 Brown, III ................ A63F 9/04 273/146
D498,797 S * 11/2004 Karstens ...................... D21/370
2004/0152498 A1 * 8/2004 Kaminkow ............. G07F 17/32 463/16
2007/0060301 A1 3/2007 Lin
2008/0051188 A1 * 2/2008 Inamura .............. G07F 17/3244 463/20
2008/0093798 A1 4/2008 Yoshizawa
(Continued)

FOREIGN PATENT DOCUMENTS

GB 1180560 A 2/1970
WO 2009111829 A1 9/2009

*Primary Examiner* — Paul A D'Agostino
(74) *Attorney, Agent, or Firm* — McDonnell Boehnen Hulbert & Berghoff LLP

(57) ABSTRACT

In one example, disclosed is a method for use with at least one die, wherein each of the at least one die is configured to have multiple resting positions and includes multiple symbols disposed thereon, and wherein for each of the at least one die, each of the multiple resting positions of that die corresponds with a respective one of the multiple symbols of that die. The method involves: the electronic gaming machine causing each of the at least one die to randomly land in one of the multiple resting positions of that die; for each of the at least one die, the electronic gaming machine determining the symbol that corresponds with the landed resting position of that die; and the electronic gaming machine performing an action based, at least in part, on the at least one determined symbol.

18 Claims, 3 Drawing Sheets

(56) References Cited

U.S. PATENT DOCUMENTS

| | | | | |
|---|---|---|---|---|
| 2008/0182640 | A1* | 7/2008 | Yoshizawa | G07F 17/32 463/17 |
| 2008/0246214 | A1 | 10/2008 | Toyoda | |
| 2009/0247280 | A1* | 10/2009 | Yoshizawa | G07F 17/3213 463/22 |
| 2009/0280904 | A1* | 11/2009 | Nicely | G07F 17/3211 463/40 |
| 2010/0059933 | A1 | 3/2010 | Sasaki | |
| 2010/0062851 | A1 | 3/2010 | Kido | |
| 2011/0018194 | A1 | 1/2011 | Nicely et al. | |
| 2011/0111833 | A1* | 5/2011 | Nordahl | A63F 9/0406 463/22 |
| 2011/0165948 | A1 | 7/2011 | Sasaki et al. | |
| 2013/0084936 | A1* | 4/2013 | Pease | G07F 17/32 463/18 |
| 2013/0087971 | A1* | 4/2013 | Klein | G07F 17/3216 273/145 A |
| 2013/0225254 | A1* | 8/2013 | Pececnik | G07F 17/326 463/17 |
| 2014/0162758 | A1* | 6/2014 | Pececnik | G07F 17/3288 463/22 |

* cited by examiner

ELECTRONIC GAMING MACHINE WITH DIE-BASED RANDOM RESULT GENERATOR

PRIORITY

This application claims priority under 35 U.S.C. §119 to United Kingdom Patent Application No. 1321903.5 filed Dec. 11, 2013, which is hereby incorporated by reference in its entirety.

TECHNICAL FIELD

This disclosure relates to electronic gaming machines for playing games such as wager games.

BACKGROUND

Wager games come in a variety of forms, including for example a mechanical slot machine. A mechanical slot machine may include one or more reels, each of which includes multiple symbols distributed around the circumference of the reel. When a player places a wager (e.g., by placing a coin in the machine), the player is allowed to spin the reels. Each reel then comes to rest, typically with either one of the symbols, or a space in between symbols, in alignment with a pay line. A predetermined winning symbol, combination of winning symbols, or permutation of winning symbols that are aligned with the pay line may result in the player winning the game and receiving a payout. In one example, the machine may include three reels, and the pay line may be a horizontal line disposed across a center of each of the three reels.

In another example of a wager game, a mechanical slot machine may present symbols in a matrix arrangement, with each symbol changing during a spin of the game. For example, the machine may have five columns and three rows of symbols, for a total of fifteen symbols. Such machines often have multiple pay lines, each being defined by a collection of positions within the matrix. For example, the machine may have three pay lines, each corresponding to a respective row of the matrix.

While slot machines were traditionally mechanical, a modern slot machine may take the form of an electronic gaming machine that is configured to simulate functions of a mechanical slot machine. Such an electronic gaming machine may use a graphical user interface (GUI) that displays an image of one or more reels or a matrix as described above, together with animation effects to simulate a spin of the game. The machine may further include a processor and a computer software program that together facilitate functions related to the game, including for example, selecting a resting position of a real in response to a spin request, and displaying on the display symbols that correspond to the selected resting position.

For a wager game, it may be desired to provide an unpredictable game result. To do this, the machine may utilize a random (or pseudo random) number generator (RNG). For instance, the machine may cause an RNG to generate a random number, and then use the generated random number as a basis for selecting a position of a reel (e.g., by using a mapping table). This may allow the machine to provide a random, unpredictable result of the game.

In traditional electronic gaming machines, an RNG is implemented in software or by means of firmware in a self-contained hardware module. Notably however, gaming establishments (e.g., casinos) that use electronic gaming machines with this type of RNG are often subject to certain regulatory restrictions. For example, a casino may be limited to having a specified maximum number of electronic gaming machines with this type of RNG.

It is therefore desirable to provide an electronic gaming machine that can provide random game results, but that is not dependent on a traditional RNG.

SUMMARY

Viewed from one aspect, the disclosure provides an electronic gaming machine for use with at least one die, wherein each of the at least one die is configured to have multiple resting positions and includes multiple symbols disposed thereon, and wherein for each of the at least one die, each of the multiple resting positions of that die corresponds with a respective one of the multiple symbols of that die. The electronic gaming machine includes a processor and a non-transitory computer readable medium having stored thereon instructions that, when executed by the processor, cause the electronic gaming machine to perform a set of functions including (i) causing each of the at least one die to randomly land in one of the multiple resting positions of that die; (ii) for each of the at least one die, determining the symbol that corresponds with the landed resting position of that die; and (iii) performing an action based, at least in part, on the at least one determined symbol.

In some embodiments, the at least one die includes a first die that (i) is cube shaped, (ii) is configured to have six resting positions, and (iii) includes six symbols disposed thereon, and wherein the six symbols are a first symbol, a second symbol, a third symbol, a fourth symbol, a fifth symbol, and a sixth symbol that take the form of one dot, two dots, three dots, four dots, five dots, and six dots, respectively.

In some embodiments, the at least one die includes multiple dies (i.e., dice).

In some embodiments, the act of causing each of the at least one die to randomly land in one of the multiple resting positions of that die involves using a shaker device to shake each of the at least one die.

In some embodiments, the act of determining the symbol that corresponds with the landed resting position of that die involves using a camera to capture the symbol that corresponds with the landed resting position of that die.

In addition to being configured to have multiple resting positions and having multiple symbols disposed thereon, a die may have a particular characteristic. For example, the die may have a particular color or a particular order designation among other ones of the at least one die. Based on this characteristic, the electronic gaming machine may perform a second action. As such, in some embodiments, the action described above is a first action and the set of functions further includes (i) the electronic gaming machine determining a characteristic of at least one of the at least one die; and (ii) the electronic gaming machine performing a second action based, at least in part, on the determined characteristic.

The electronic gaming machine may be configured to facilitate play of a variety of different games. For example, the electronic gaming machine may be configured to facilitate play of a reel type wager game. In such instances, the first action may involve selecting a position of a reel from among a group of positions of the reel. Further, in such instances, the second action may involve selecting the reel from among a group of reels of the game.

In instances where the game is a reel-type game, the act of performing the first action based, at least in part, on the at least one determined symbol may involve (i) for each of the at least one determined symbol, using the determined symbol to determine a numeric value; and (ii) using the at least one determined numeric value to select the position of the reel. Further, the act of using the at least one determined numeric value to select the position of the reel may involve (i) calculating an index as a function of the at least one determined numeric value; and (ii) using a mapping table to map the calculated index to the selected position.

Viewed from a second aspect, the disclosure provides a method for use with at least one die, wherein each of the at least one die is configured to have multiple resting positions and includes multiple symbols disposed thereon, and wherein for each of the at least one die, each of the multiple resting positions of that die corresponds with a respective one of the multiple symbols of that die. The method involves (i) an electronic gaming machine causing each of the at least one die to randomly land in one of the multiple resting positions of that die; (ii) for each of the at least one die, the electronic gaming machine determining the symbol that corresponds with the landed resting position of that die; and (iii) the electronic gaming machine performing an action based, at least in part, on the at least one determined symbol.

Viewed from a third aspect, the disclosure provides a non-transitory computer readable medium having stored thereon instructions that, when executed by a processor, cause an electronic gaming machine to perform a set of functions, wherein the electronic gaming machine is configured for use with at least one die, wherein each of the at least one die is configured to have multiple resting positions and includes multiple symbols disposed thereon, and wherein for each of the at least one die, each of the multiple resting positions of that die corresponds with a respective one of the multiple symbols of that die. The set of functions include (i) causing each of the at least one die to randomly land in one of the multiple resting positions of that die; (ii) for each of the at least one die, determining the symbol that corresponds with the landed resting position of that die; and (iii) performing an action based, at least in part, on the at least one determined symbol.

Viewed from a fourth aspect, the disclosure provides a method for use with at least one die having a particular characteristic. The method involves (i) an electronic gaming machine determining the characteristic of at the at least one die; and (ii) the electronic gaming machine performing an action based, at least in part, on the determined characteristic.

The features listed above as being features of embodiments of the first aspect of the disclosure, are equally applicable to embodiments of the second, third, and fourth aspects of the disclosure.

BRIEF DESCRIPTION OF THE DRAWINGS

Some embodiments of the disclosure will now be described by way of example and with reference to the accompanying drawings, in which.

DETAILED DESCRIPTION

Throughout this disclosure, any reference to “a” or “an” refers to “at least one,” and any reference to “the” refers to “the at least one,” unless otherwise specified, or unless the context clearly dictates otherwise.

Figure 1:
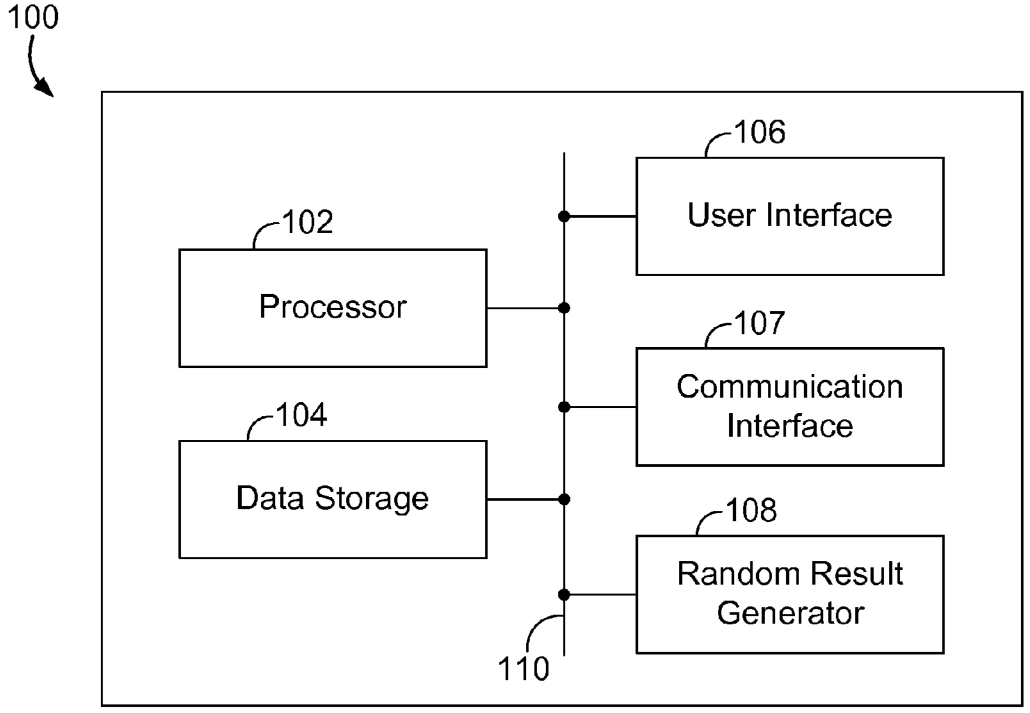
FIG. 1 is a simplified block diagram of an example electronic gaming machine in accordance with the disclosure.

FIG. 1 is a simplified block diagram of an example electronic gaming machine 100 that is configured to facilitate functions in connection with a game such as a reel type wager game.

As shown in FIG. 1, the machine 100 may include a processor 102, a data storage 104, a user interface 106, a communication interface 107, and a random result generator 108, each of which may be connected to each other via a system bus, network or other connection mechanism 110.

The processor 102 may include one or more general purpose processors (e.g., microprocessors) and/or one or more special purpose processors (e.g., digital signal processors (DSPs)).

The data storage 104 may include one or more volatile and/or non-volatile storage components, such as magnetic, optical, flash, or organic storage, and may be integrated in whole or in part with the processor 102. The data storage 104 may include removable and/or non-removable components.

Generally, the processor 102 may be configured to execute program instructions (e.g., compiled or non-compiled program logic and/or machine code) stored in the data storage 104 to perform one or more of the functions described herein and/or shown in the accompanying drawings, such as by interfacing with the user interface 106, the communication interface 107, and the generator 108. As such, the data storage 104 may take the form of a non-transitory computer-readable storage medium, having stored thereon program instructions that, upon execution by the processor 102, cause the machine 100 to perform one or more of the functions described herein and/or shown in the accompanying drawings.

As another example, the data storage 104 may store data related to the electronic gaming machine 100 and/or the game played thereon. For example, the data storage 104 may store game data that has been transmitted to the machine 100 from a download server over a network.

The user interface 106 may function to allow the machine 100 to interact with a user (e.g., a player), such as to receive input from a user and to provide output to the user. Thus, the user interface 106 may include input components such as a computer mouse, a keyboard, a touch-sensitive panel, a knob, a button, or a switch. The user interface 106 may also include output components such as a display screen (which, for example, may be combined with a touch sensitive panel) or a speaker.

The user interface 106 may be arranged in various configurations. For example, the user interface 106 may be arranged to have two display screens, namely a top display screen for showing a state and/or result of the game, and bottom display screen combined with a touch-sensitive panel that together provides virtual game controls. Other variations are possible as well.

Generally, the communication interface 107 functions to allow the machine 100 to communicate, using analog or digital modulation, with other devices, access networks, and/or transport networks. For example, a communication interface may take the form of a wired interface, such as an Ethernet, Token Ring, or USB port. As another example, a communication interface may take the form of a wireless interface, such as a Wifi, BLUETOOTH®, global positioning system (GPS), or a wide-area wireless (e.g., WiMAX or LTE) interface.

Figure 2:
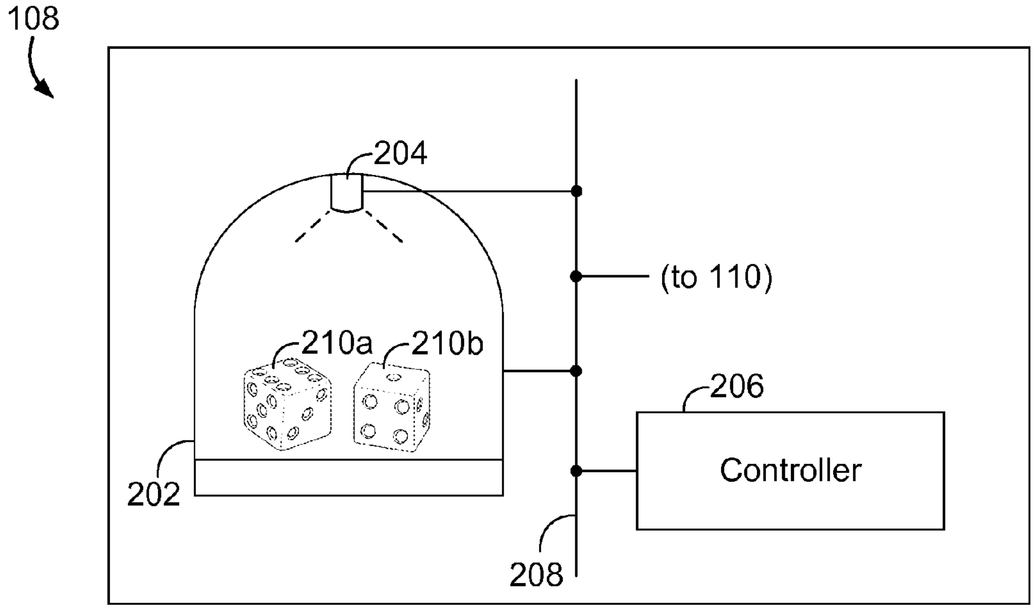
FIG. 2 is a simplified diagram of an example random result generator in accordance with the disclosure.

Generally, the generator 108 is configured to generate a random result (e.g., a random number or a random symbol). FIG. 2 is a simplified block diagram of the generator 108. As shown in FIG. 2, the generator 108 includes a shaker device 202, a camera 204, and a controller 206, each of which may be connected to each other via a connection mechanism 208, which itself may be connected to the connection mechanism 110, and therefore to other components of the machine 100. Other variations are possible as well.

The shaker device 202 is configured to be used with at least one die. A die is a device configured to have multiple resting positions, and includes multiple symbols disposed thereon. Further, each of the multiple resting positions of the die corresponds with a respective one of the multiple symbols of the die.

In one example, a traditional die is cube-shaped and has six flat sides that the die may rest on. As such, the die is configured to have six resting positions. Also, a traditional die has six symbols disposed thereon, with each symbol being a different number of dots from one through six, and with each symbol being disposed on a different side of the die. As such, the die has a first symbol, a second symbol, a third symbol, a fourth symbol, a fifth symbol, and a sixth symbol taking the form of one dot, two dots, three dots, four dots, five dots, and six dots, respectively. As described above, each of the six resting positions corresponds with a respective one of the six symbols. When a die is in a given resting position, traditionally the corresponding symbol is considered to be the symbol that is facing "up" (i.e., the symbol that is opposite the symbol on the side on which the die is resting). However, in other instances, another symbol (e.g., the symbol facing "down" or the symbol on the side closest to the camera 204) may be considered to be the corresponding symbol for a given resting position.

In some instances, a user may roll or throw a die to cause the die to randomly land in one of the multiple resting positions of the die so as to randomly "select" a result of the die. For example, where the die is a traditional cube shaped die as described above, a user may roll the die to select a number from one through six (as indicated by the number of dots corresponding to the landed resting position of the die). Other variations are possible as well.

As shown in FIG. 2, in one example, the generator 108 includes two dies, namely a first die 210*a* and a second die 210*b*, each of which is a traditional cube shaped die as described above. Notably however, a die may come in other forms. For instance, a die may be configured to have fewer or more sides, resting positions and/or symbols disposed thereon. Further, the symbols may take a variety of different forms (barcodes, Arabic numerals, etc.)

In addition to being configured to have multiple resting positions and including multiple symbols disposed thereon, a die may have a particular characteristic such as a color, size, weight, shape, or order designation among other dies.

Generally, the shaker device 202 is a configured to cause the die to randomly land in one of the multiple resting positions of the die by shaking, tumbling, rolling or otherwise moving the die (e.g. with sudden, jerky movements caused by a motor or the like or a flexible metal dice popper such as a dice popper used in the Pop-O-Matic® Trouble Game® by Milton-Bradley Company), thereby causing the die to randomly land in one of the multiple resting positions of the die. Other variations are possible as well.

Generally, the camera 204 (or other capture device) is configured to capture an image or video of the die. The machine 100 may analyze such an image to determine the symbol corresponding to the resting position in which the die rests, as described in greater detail below. In some instances, the camera 204 may be mounted on or integrated with the shaker device 202 (e.g., on or with a housing of the shaker device 202). However, in other instances, the camera 204 may be mounted such that the lens of the camera is directed towards the shaker device 202, but such that the camera 204 does not physically touch the shaker device 202. This may be desired in some configurations where the shaker device 202 may be activated by a user, and where the camera 204 is positioned so as not to interfere with the user's ability to active the shaker device 202. Other variations are possible as well.

Note that while one example generator 108 has been described above, the generator 108 may be configured in a variety of different ways. For example, instead of the shaker device 202, the generator 108 may include a mechanical device configured to throw or drop a die onto a surface, thereby causing the die to randomly land in one of resting positions of the die. Other variations are possible as well.

Further, the generator 108 may include a device other than the camera 204 that the machine 100 may use to determine the symbol that corresponds with the landed resting position of the die. For instance, where the symbols are barcodes, the generator may include a barcode reader that the machine 100 may use to determine the symbol that corresponds to the landed position of the die. Other variations are possible as well.

The controller 206 may be configured to cause the shaker device 202 and/or the camera 204 to perform one or more functions. In some instances, the controller 206 may include a processor and a data storage such as those described above.

In some examples, the generator 108 may be positioned on top of a cabinet or housing of the machine 100, or in another position such that it is in view of a player playing a game on the machine 100.

Figure 3A:
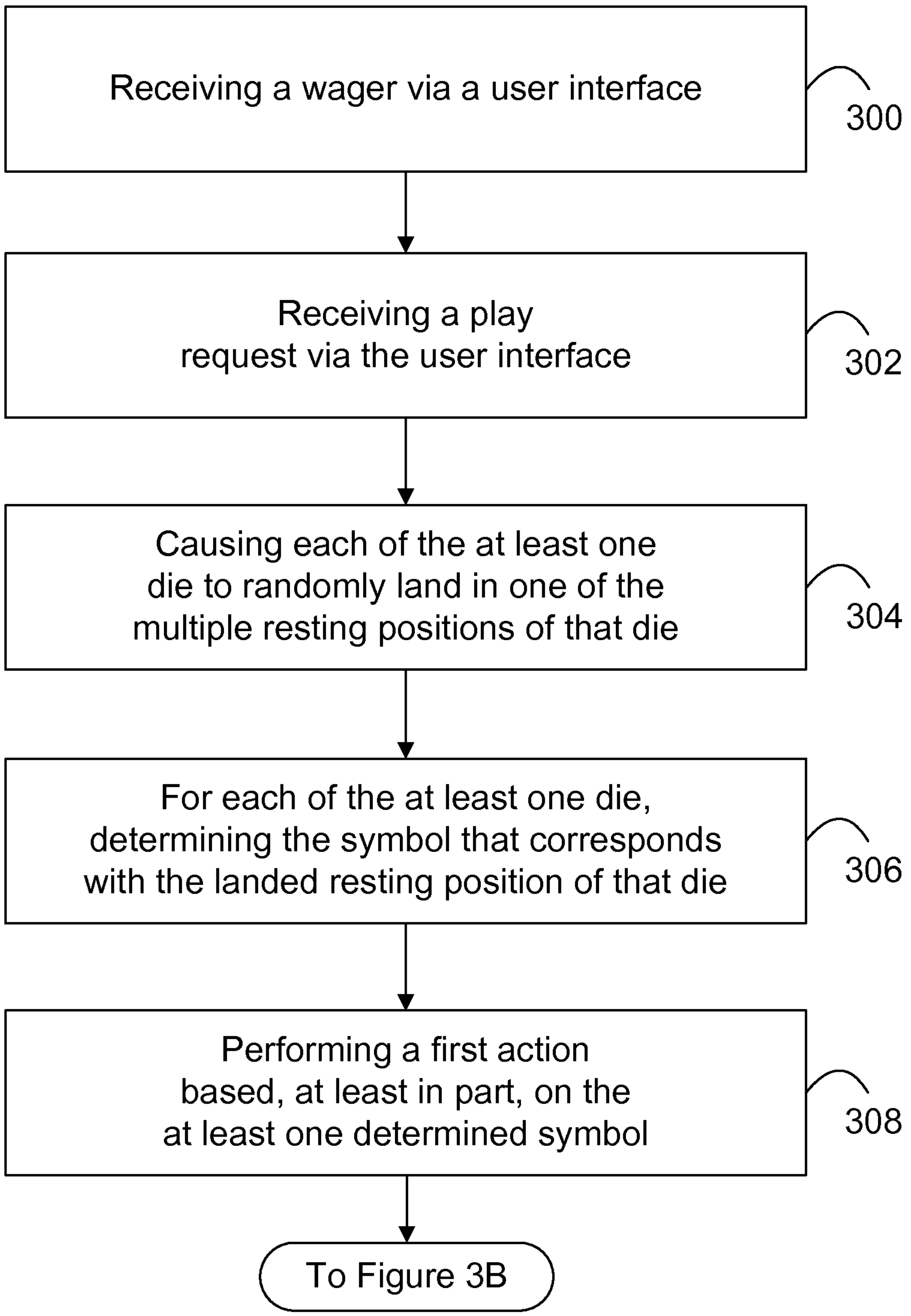
FIG. 3A is a first part of a flow chart showing functions of an example method in accordance with the disclosure.
Figure 3B:
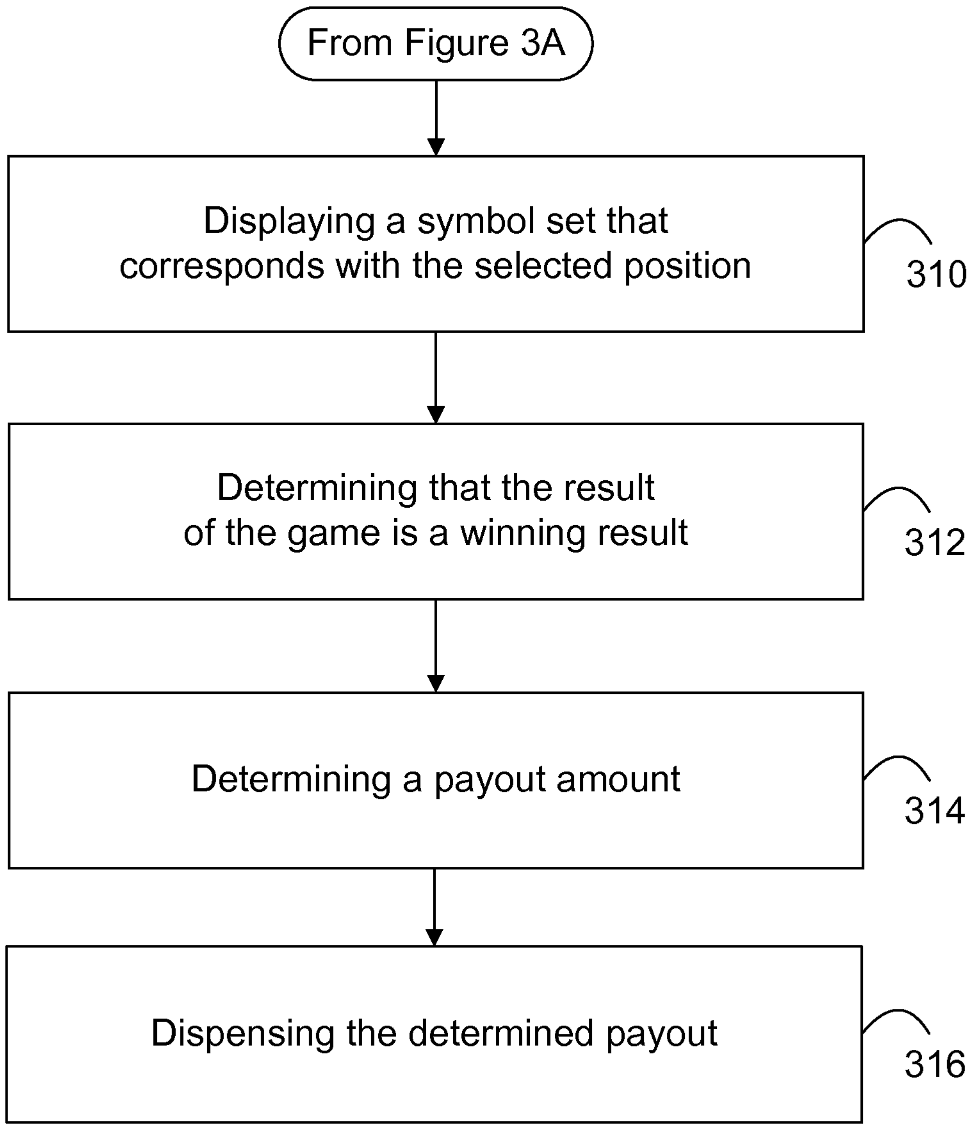
FIG. 3B is a second part of the flow chart of FIG. 3A.

FIGS. 3A and 3B show a flow chart with functions of an example method.

At block 300, the method may involve receiving a wager via a user interface. For instance, this may involve the machine 100 receiving a wager in the form of coins, chips, or electronic points, for instance.

At block 302, the method may involve receiving a play request via the user interface. For instance, this may involve the machine 100 receiving a "spin" request via the user interface 106. This may allow a player to pull a lever or push a button on the machine 100 to request a play of a game.

At block 304, the method may involve causing each of the at least one die to randomly land in one of the multiple resting positions of that die. For instance, this may involve the machine 100 using the shaker device to shake each die 210*a*, 210*b*. As shown in FIG. 2, this may result in the die 210*a* landing in a resting position and having an upward facing and corresponding symbol of six dots. Further, this may result in the die 210*b* landing in a resting position and having an upward facing and corresponding symbol of one dot.

In one example, the machine 100 using the shaker device 202 to shake the at least one die may involve the processor 102 transmitting an instruction to the controller 206, which in turn may send an instruction to the shaker device 202. In another example, the processor 102 may send an instruction directly to the shaker device 202. In yet another example, the machine 100 causing may cause the shaker device 202 to shake the at least one die in response to receiving a request via the user interface or perhaps in response to a user activating the shaker device (e.g., by pressing down on a bubble shaped housing of the shaker device 202. Other variations are possible as well.

At block 306, the method may involve for each of the at least one die, determining the symbol that corresponds with the landed resting position of that die. For instance, this may involve for each die 210*a*, 210*b*, the machine 100 using the camera 204 to determine the symbol that corresponds with the landed resting position of that die. In particular, this may involve the machine 100 determining the symbol of six dots for the first die 210*a*, and the machine 100 determining the symbol of one dot for the second die 210*b*. Further, this may involve the camera 204 taking an image of each die 210*a*, 210*b*, transmitting the images to the controller 206, and the controller 206 analyzing the images to determine each corresponding symbol. Other variations are possible as well.

At block 308, the method may involve performing a first action based, at least in part, on the at least one determined symbol. For instance, this may involve the machine 100 performing a first action based, at least in part on the one dot symbol, the six dot symbol, or a combination of the one and six dot symbols as described in greater details below.

The first action may take a variety of forms and may depend on the game being played on the machine 100 and/or the state of the game. For instance, where the game is a reel type wager game, performing the action may involve selecting a position of a reel of the game from among a group of positions of the reel. In one example, this may involve (i) for each of the at least one determined symbol, using the determined symbol to determine a numeric value; and (ii) using the at least one determined numeric value to select the position of the reel.

In instances where the symbols disposed on the die are set of dots, the machine 100 may translate the number of dots on a given symbol to a corresponding number. As such, the machine 100 may translate the six dots on the first die 210*a* to the number six, and the one dot on the second die 210*b* to the number one. The machine 100 may then use these determined numbers to select a position of the reel.

The act of using the at least one determined numeric value to select the position of the reel may involve (i) calculating an index as a function of the at least one determined numeric value; and (ii) using a mapping table to map the calculated index to the selected position.

The act of calculating the index may occur in a variety of ways. In some instances, this may involve the machine 100 performing a mathematical operation using the at least one determined numeric symbols. For instance, where the reel type game has a reel that may land in one of thirty-six distinct positions, the machine 100 may calculate the index using the following formula P=(D1−1)*6+(D2−1), in which P is the reel resting position, D1 is the numeric value of the first die 210*a*, and D2 is the numeric value of the second die 210*b*. Thus, for illustrative purposes, given the numeric values six and one for the dies 210*a* and 210*b*, respectively, the corresponding index is 30 (i.e., (6−1)*6+(1−1)). The machine 100 may then map the calculated index to the selected position (e.g., based on a mapping table stored in the data storage 104).

Notably however, other formulas may be used to calculate an index. For instance, where the reel type game has a reel that may land in one of two hundred and sixteen distinct positions, the machine 100 may calculate the index using the following formula P=(D1−1)*36+(D2−1)*6+D3, in which P is the reel resting position, D1 is the numeric value of a first die, D2 is a numeric value of a second die, and D3 is a numeric value of a third die. Other variations are possible as well.

The machine 100 may determine, in a variety of ways, which of the at least one dies (and therefore which of the at least one determined numeric values) maps to the variable D1 and which maps to the variable D2. In one example, each of the at least one dies may have a designation such as "D1" or "D2" marked thereon, which the machine 100 may determine (e.g., using the camera 204). Additionally, or alternatively, the machine 100 may use another characteristic of the at least one to make this determination. Additionally, or alternatively, the machine 100 may use two shaker devices, one with a die corresponding to D1, and another with a die corresponding to D2. Notably, while such variations have been described in connection with the particular example of two dies (and therefore two numeric values), it should be noted that such variations may be applied to other examples in a similar manner. Accordingly, more generally, the act of calculating an index as a function of the at least one determined numeric value may involve mapping a particular one of the at least one determined numeric value to a variable in the function.

In another example where the game is a reel type wager game or perhaps where the game is a matrix type wager game, performing the action may involve selecting a symbol of the game from among a group of symbols. This may involve (i) for each of the at least one determined symbol, using the determined symbol to determine a numeric value; and (ii) using the at least one determined numeric value to select the symbol of the game. Further, the act of using the at least one determined numeric value to select the symbol of the game may involve (i) calculating an index as a function of the at least one determined numeric value; and (ii) using a mapping table to map the calculated index to the selected symbol of the game.

As noted above, in addition to being configured to have multiple resting positions and including multiple symbols disposed thereon, a die may have one or more other characteristics. In such instances, the method may further involve (i) determining a characteristic of at least one of the at least one die; and performing a second action based, at least in part, on the determined characteristic.

Continuing with the example where the machine 100 plays a reel type game, the second action may involve selecting a reel from among a group of reels of the game based, at least in part, on the determined characteristic. This may allow the machine 100 to both select a particular reel, and select a resting position of the selected reel.

To illustrate this feature, consider a reel type game that has five reels, each of which can be positioned in a corresponding one of thirty six resting positions. In this instance, the generator 108 may include ten dies of varying colors. For example, the generator may include two red dies, two orange dies, two yellow dies, two green dies, and two blue dies. In this instance, determining a characteristic of at least one of the at least one die may involve the machine 100 determining a red color characteristic of the dies. Based on the dies being red, the machine 100 may select one of the five reels of the game. Further, the machine 100 may perform the functions described above in connection with blocks 306 and 308 such that the machine 100 may select a resting position for the selected reel (i.e., for the first reel). The machine 100 may repeat this process for each pair of like-colored dies, thereby allowing the machine 100 to select resting positions for each of the five reels of the game.

In another example, instead of the generator 108 having a single shaker device 202 with a like-colored die pair for each reel of the game, the generator 108 may have a separate shaker device 202 for each reel of the game, and each separate shaker device 202 may include two dies. Other variations are possible as well.

Also, the machine 100 may perform the second action based, at least in part, on the determined characteristic in a manner similar to how the machine 100 may perform the first action as described above. As such, the machine 100 may use a mapping table to map the determined characteristic to the second action.

As noted above, a die can have a variety of different characteristics, including for example a color, size, weight, or order designation. Accordingly, the machine 100 may use any such characteristic as a basis for performing the section action. For instance, where the characteristic is an order designation, the machine 100 may determine that two particular dies from the at least one die have a first and second order designation because they are the two closest dies to the camera 204. Accordingly, the machine may use the symbols on the first and second dies as a basis for selecting a position of a first reel. Likewise, the machine 100 may determine that a third and fourth die from the at least one die have a third and fourth order designation because they are the next two closest dies to the camera 204, and so forth. Other variations are possible as well.

In another example, where the game is a reel type wager game or perhaps a matrix-type wager game, the section action may involve selecting a symbol position of the matrix.

At block 310, the method may involve displaying a symbol set that corresponds with the selected position. For instance, this may involve the machine 100 displaying on a display of the user interface 106 the symbol set that corresponds with the selected position of the reel. Such a symbol set may include, for instance, the symbols of the reel that are considered "in play" when the reel comes to rest.

At block 312 the method may involve determining that the result of the game is a winning result. For instance, the method may involve the machine 100 determining that the result of the game is a winning result.

At block 314, the method may involve determining a payout amount. For instance, the method may involve the machine 100 determining a payout amount as a function of the received wager and a stored payout table.

At block 316, the method may involve dispensing the determined payout or otherwise facilitating the determined payout to the player. For instance, the method may involve the machine 100 dispending coins or chips, or providing funds in the form of electronic points.

As an alternative to the functions at blocks 312, 314, and 316, the method may involve determining that the result of the game is a losing result, in which case a payout amount is not determined or dispensed to the player. Note that in either case (i.e., whether the result of the game is a winning or losing result), the method may return to block 300 to facilitate play of another game.

In some embodiments, the machine 100 may be configured to play multiple games simultaneously (e.g., via separate user interfaces). In such instances, the machine may use results from the generator 108 for multiple games. In some instances, the generator may be configured to have multiple shaker devices 202 (e.g., one for each game being played), with each having a corresponding at least one die and a corresponding camera 204. In this variation, the machine 100 may operate all of the shaker devices 202 at or about the same time so as to provide random results to all of the games at or about the same time. In one example, the machine 100 may transmit a suitable instruction to a single controller 206 that in turn transmits suitable instructions to all of the shaker devices 202. Other variations are possible as well.

Notably, in some instances, various portions of the machine 100 may be grouped in one or more sub-machines that communicate via wired or wireless network interfaces.

The disclosed electronic gaming machine may have several advantages over traditional electronic gaming machines. As one example, it is anticipated that the disclosed machine may be considered a "live" game in the context of one or more regulatory restrictions, and therefore such machines may not be subject to the same limitations as traditional electronic gaming machines (i.e., that use software based RNGs).

As another example benefit, a player may prefer using the disclosed machine over a traditional machine since the disclosed machine may provide a player with more confidence that that the machine is actually providing random results. This is because the player may view the real world act that is causing the random result rather than the player simply relying on output of a software-based RNG.

While one or more functions of the presently disclosed method have been described as being performed by the certain entities (e.g., the machine 100), one or more of the functions may be performed by any entity, including but not limited to those described herein.

Further, the described functions throughout this application need not be performed in the disclosed order, although in some examples, the recited order may be preferred. Also, not all functions need to be performed to achieve the desired advantages of disclosed machines and methods, and therefore not all functions are required.

While examples have been described in terms of select embodiments, alterations and permutations of these embodiments will be apparent to those of ordinary skill in the art. Other changes, substitutions, and alterations are also possible without departing from the disclosed machines and methods in their broader aspects as set forth in the following claims.

The invention claimed is:

1. A method for use with an electronic gaming machine and at least one die, wherein the electronic gaming machine is configured to facilitate playing a reel type wager game, wherein each of the at least one die is configured to have multiple resting positions and includes multiple symbols disposed thereon, and wherein for each of the at least one die, each of the multiple resting positions of that die corresponds with a respective one of the multiple symbols of that die, the method comprising:

the electronic gaming machine causing each of the at least one die to randomly land in one of the multiple resting positions of that die;

for each of the at least one die, the electronic gaming machine determining the symbol that corresponds with the landed resting position of that die; and the electronic gaming machine performing an action based, at least in part, on the at least one determined symbol for each of the at least one die, wherein performing the action comprises selecting a position of a reel of the game from among a group of positions of the reel.

2. The method of claim 1, wherein the at least one die comprises a first die that (i) is cube shaped, (ii) is configured to have six resting positions, and (iii) includes six symbols disposed thereon, and wherein the six symbols comprise a first symbol, a second symbol, a third symbol, a fourth symbol, a fifth symbol, and a sixth symbol that comprise one dot, two dots, three dots, four dots, five dots, and six dots, respectively.

3. The method of claim 1, wherein causing each of the at least one die to randomly land in one of the multiple resting positions of that die comprises using a shaker device to shake each of the at least one die.

4. The method of claim 1, wherein determining the symbol that corresponds with the landed resting position of that die comprises using a camera to capture the symbol that corresponds with the landed resting position of that die.

5. The method of claim 1, wherein the action is a first action, the method further comprising:

the electronic gaming machine determining a characteristic of at least one of the at least one die; and the electronic gaming machine performing a second action based, at least in part, on the determined characteristic.

6. The method of claim 5, wherein the characteristic comprises a color.

7. The method of claim 5, wherein the characteristic comprises an order designation.

8. The method of claim 1, further comprising the electronic gaming machine displaying a symbol set that corresponds with the selected position.

9. The method of claim 1, wherein performing the action based, at least in part, on the at least one determined symbol for each of the at least one die comprises:

for each of the at least one determined symbol for each of the at least one die, using the determined symbol to determine a numeric value; and using the at least one determined numeric value to select the position of the reel.

10. The method of claim 9, wherein using the at least one determined numeric value to select the position of the reel comprises:

calculating an index as a function of the at least one determined numeric value; and using a mapping table to map the calculated index to the selected position.

11. The method of claim 10, wherein calculating the index as a function of the at least one determined numeric value comprises mapping a particular one of the at least one determined numeric value to a variable in the function.

12. The method of claim 1, wherein the at least one die comprises multiple dies.

13. The method of claim 1, wherein the action is a first action, the method further comprising:

the electronic gaming machine determining a characteristic of at least one of the at least one die; and the electronic gaming machine selecting the reel from among a group of reels of the game based, at least in part, on the determined characteristic.

14. The method of claim 1, the method further comprising at least one function from a group of functions comprising:

receiving a wager via a user interface;

receiving a play request via the user interface;

determining a payout amount; and dispensing the payout amount.

15. An electronic gaming machine for use with at least one die, wherein the electronic gaming machine is configured to facilitate playing a reel type wager game, wherein each of the at least one die is configured to have multiple resting positions and includes multiple symbols disposed thereon, and wherein for each of the at least one die, each of the multiple resting positions of that die corresponds with a respective one of the multiple symbols of that die, the electronic gaming machine comprising:

a processor;

a non-transitory computer readable medium having stored thereon instructions that, when executed by the processor, cause the electronic gaming machine to perform a set of functions comprising:

causing each of the at least one die to randomly land in one of the multiple resting positions of that die;

for each of the at least one die, determining the symbol that corresponds with the landed resting position of that die; and performing an action based, at least in part, on the at least one determined symbol for each of the at least one die, wherein performing the action comprises selecting a position of a reel of the game from among a group of positions of the reel.

16. The electronic gaming machine of claim 15 further comprises a shaker device, and wherein causing each of the at least one die to randomly land in one of the multiple resting positions of that die comprises using the shaker device to shake each of the at least one die.

17. The electronic gaming machine of claim 15 further comprising a camera, wherein determining the symbol that corresponds with the landed resting position of that die comprises using the camera to capture the symbol that corresponds with the landed resting position of that die.

18. A non-transitory computer readable medium having stored thereon instructions that, when executed by a processor, cause an electronic gaming machine to perform a set of functions, wherein the electronic gaming machine is configured to facilitate playing a reel type wager game, wherein the electronic gaming machine is configured for use with at least one die, wherein each of the at least one die is configured to have multiple resting positions and includes multiple symbols disposed thereon, and wherein for each of the at least one die, each of the multiple resting positions of that die corresponds with a respective one of the multiple symbols of that die, the set of functions comprising:

causing each of the at least one die to randomly land in one of the multiple resting positions of that die;

for each of the at least one die, determining the symbol that corresponds with the landed resting position of that die; and performing an action based, at least in part, on the at least one determined symbol for each of the at least one die, wherein performing the action comprises selecting a position of a reel of the game from among a group of positions of the reel.

* * * * *